March 24, 1942.  E. O. P. THEGE  2,277,185
TORSIONAL VIBRATION DAMPER
Original Filed Nov. 9, 1934   2 Sheets-Sheet 1

INVENTOR
Edwin Ossian Percival Thege
BY
ATTORNEY

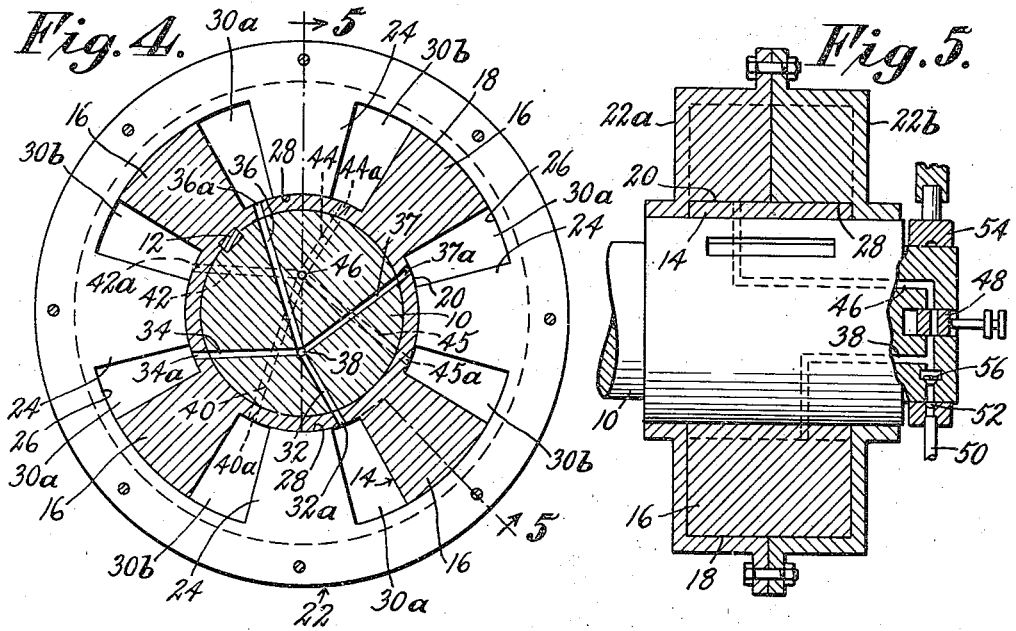
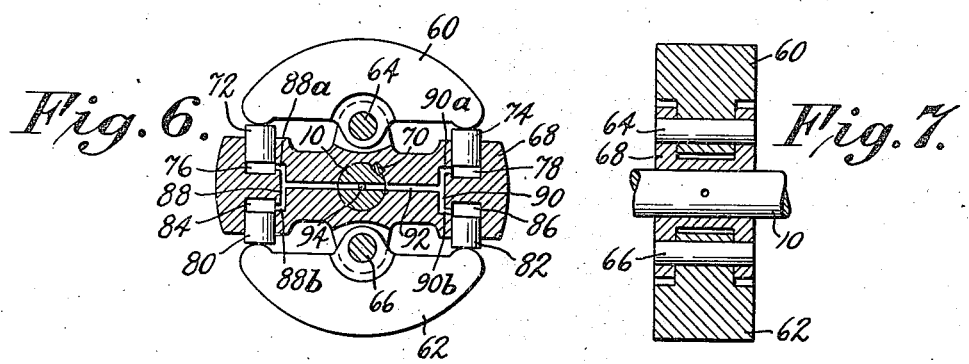
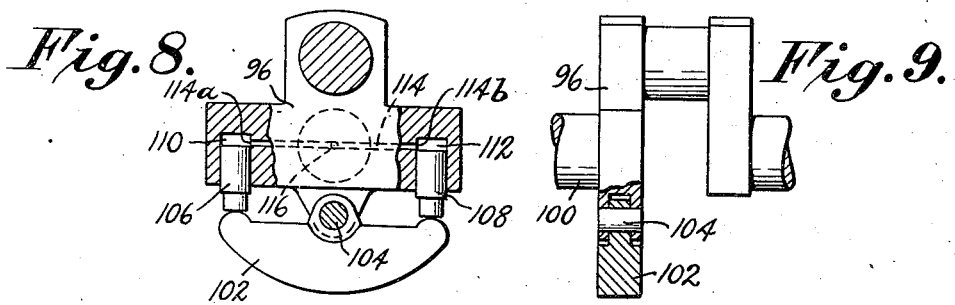
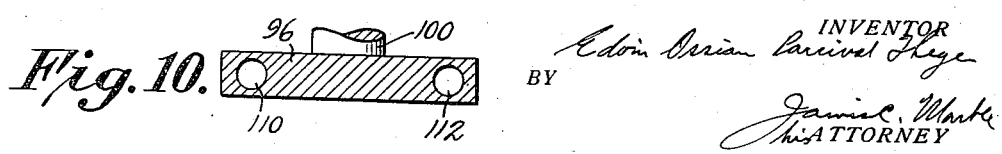

Patented Mar. 24, 1942

2,277,185

UNITED STATES PATENT OFFICE 2,277,185

TORSIONAL VIBRATION DAMPER

Edvin Ossian Parcival Thege, Stockholm, Sweden

Original application November 9, 1934, Serial No. 752,324. Divided and this application April 27, 1940, Serial No. 331,985. In Sweden December 4, 1933

15 Claims. (Cl. 74—604)

The present application is a division application disclosing and claiming part of the subject matter disclosed and originally claimed in my copending application Serial No. 752,324, filed November 9, 1934.

The present invention relates to torsional vibration dampers and has for its principal object the provision of a new and improved device for damping such vibrations by the aid of inertia mass movably mounted with respect to the vibratory body and operating in accordance with a new principle hereinafter more fully to be explained in conjunction with the accompanying drawings, in which;

Fig. 4 is a more or less diagrammatic transverse view, partly in section, of a damping device embodying the invention applied to a shaft;

Fig. 5 is a longitudinal sectional view of the device shown in Fig. 4;

Figs. 6 and 7 are more or less diagrammatic transverse and longitudinal views respectively of a second embodiment of the invention, and Figs. 8, 9 and 10, are more or less diagrammatic transverse longitudinal and top views, respectively, of a still another embodiment.

Figure 1:
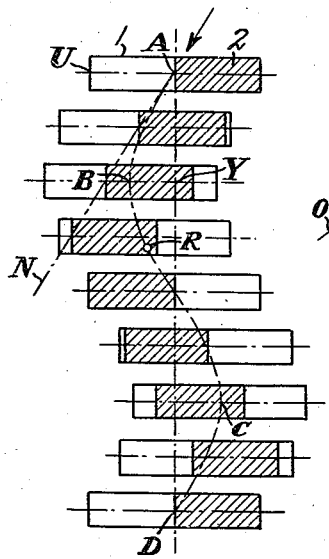
Fig. 1 is a diagram illustrating the principles upon which the invention is based.

As is well known, any shaft or other rotary system to which gyratory masses are fitted has a natural tendency to produce torsional vibrations having a certain periodicity. In order to produce such vibrations, it is only necessary for a shock or the like, having a frequency bearing some given relation to the natural frequency of the shaft, to act in a manner producing torque on the shaft. Thus, in the case of internal combustion engines, the varying tangential forces acting on the shaft system induce torsional vibration therein when the impulses from the engine cylinders have a periodicity which in one way or another coincides with the natural vibration frequency of the shaft.

The torsional movement due to natural periodic vibration, if unchecked, may readily reach an amplitude of dangerous proportions, and in accordance with the principles of the present invention this is avoided by the action of damping mass in the form of one or more bodies mounted to move freely or substantially freely relative to the shaft, which mass, when the vibration has reached a given amplitude, operates to directly counteract the torsionally vibratory movement.

The damper is preferably fitted on the shaft at a place where the torsional deflection is relatively large, and in its simplest form consists of an inertia mass located with its center of gravity radially offset from the axis of rotation of the shaft and mounted to have limited but free or substantially free movement in tangential, peripheral or like direction productive of angular displacement between the inertia mass and the shaft.

Further, the terminal positions which limit the relative angular movement of the inertia mass are determined by silencing abutments consisting of liquid cushions or the like against which the mass impacts.

During a torsional vibratory movement or deflection of the shaft the inertia mass, which is substantially free or loose insofar as angular displacement is concerned, is brought to one of its terminal positions against one of the abutments. The mass then moves with the abutment. When the velocity of the abutment decreases and the direction of the torsional deflection reverses, the inertia mass continues its movement until it is stopped in its other terminal position by the second abutment. If the extent of such limited movement or stroke of the mass is suitably chosen with respect to the amplitude of the vibration, the inertia mass will meet the second abutment when the direction of the torsional deflection is opposite that of the mass, and the latter will thereby exert a damping effect on the vibration due to the force derived from the impact of the mass against the abutment.

By the use of a damper operating as above described, the great advantage is obtained that the maximum amplitude of vibration and consequently the maximum stress in the shaft due thereto, can be predetermined, and the further advantage is also gained that the damper has the same effect for all vibrations. The damper is thus independent of the degree of vibration.

Figure 2:
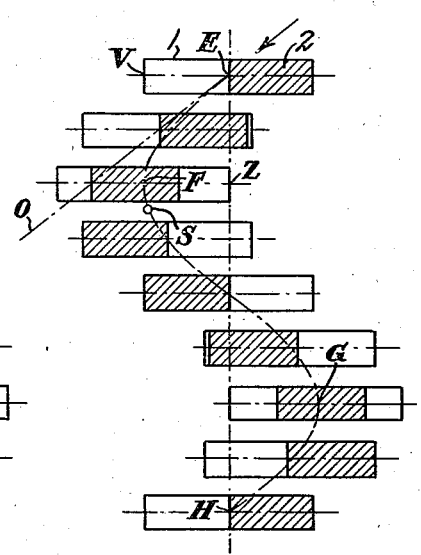
Fig. 2 is a similar diagram showing a different relation between vibration amplitude and the extent of movement or stroke of the inertia mass.
Figure 3:
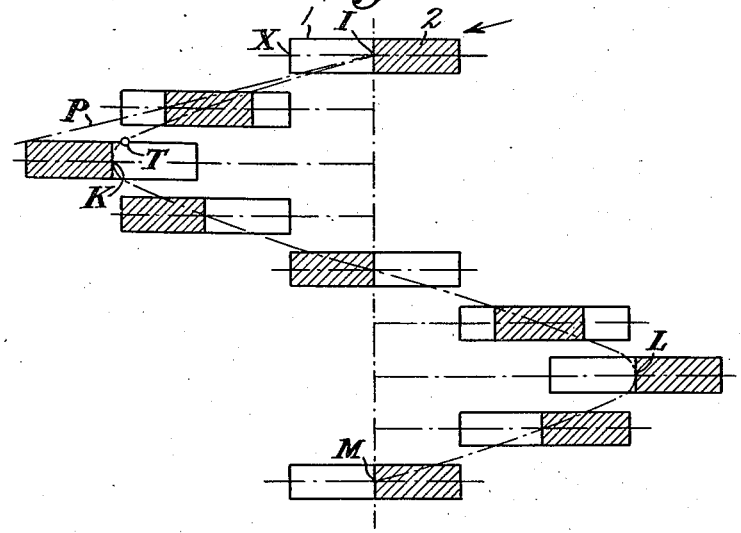
Fig. 3 is a diagram similar to Figs. 1 and 2 showing still another relation between vibration amplitude and stroke of the mass.

In order to more fully explain the action, reference will now be had more particularly to the diagrams of Figs. 1 to 3, illustrative of the theoretical principles involved.

In Fig. 1, the vibratory part is marked 1, and is shown as a tube shaped housing closed at its ends. The inertia mass is shown in the form of a piston 2, freely movable in the housing between the abutments formed by the closed ends of the latter. It is assumed that the vibration of part I, follows a sinusoidal course with respect to time, indicated by the sine curve ABCD in the diagram.

The motions of the housing and of the piston are different. Assuming that in the initial position A the piston 2 is in contact with one end abutment, or in other words, is in one of its terminal positions, it has the same velocity as that of the housing. If friction is neglected, the piston continues at constant speed, in the direction of the tangent N, while the housing follows the path of the sine curve. The piston thus leaves the abutment and moves relative to the housing until it strikes the other end abutment. This happens when the center point of the housing is at point R on the sine curve, i. e., when the housing is on its return movement and is accelerating. When the piston strikes the second abutment, its motion is reversed. This, together with the subsequent acceleration of the piston in reverse direction by the housing, requires a force from the latter the reactive force from which imposes a damping influence on the vibratory movement. The velocity of such movement is thereby decreased and the amplitude of the next vibration consequently diminished. The above described action is repeated upon the following vibration, with the result that the oscillatory motion is further reduced until its amplitude becomes so small that the piston has no further influence.

Simultaneously with the direct influence of the piston as above described, the natural frequency of the vibratory system is changed as the piston engages and disengages the abutments, which also contributes to the elimination of the vibration. Thus, through suitably proportioning the stroke and mass of the piston the extent of the deflection can be restricted to a predetermined maximum value and the stress in the shaft resulting therefrom held within permissible limits.

In the diagram of Fig. 1, the stroke UA of the piston is shown as double the amplitude BY of the vibration. In Fig. 2, the amplitude FZ is the same as the piston stroke. In this latter instance the piston strikes the abutment when the vibration has reached point S. In this case the piston acts to damp or retard the return vibratory movement, with even greater effect than in the case in Fig. 1, owing to the greater speed of the piston in a direction opposed to the movement of the vibrating body. This latter will be evident by comparison of the relative directions of the tangents represented by lines N and O in Figs. 1 and 2, respectively.

Fig. 3 illustrates a condition in which, in spite of damping action of the kind illustrated in Figs. 1 and 2, the deflection has increased to an extent such that its amplitude at K is three times as great as the piston stroke XI. This condition can occur if the mass or the stroke of the piston is too small. Still assuming no friction to retard the motion of the piston, it will strike the abutment at point T, i. e., before the vibration is on its return movement. This, of course, is not at all desirable, since in such case the piston will momentarily assist in increasing the amplitude of deflection. This condition can be avoided by incorporating a liquid brake or the like, the effect of which is to introduce resistance of substantially constant nature to movement of the piston, which resistance will operate to reduce the speed of piston movement to an extent insuring its impact against the abutment only after the vibration or oscillation is on its return movement. It is, however, preferable in all cases to proportion the mass and stroke of the piston so that the amplitude of vibration is prevented from reaching a value such as is indicated in Fig. 3.

It should be noted in connection with the above that even under the condition indicated in Fig. 3, the piston, when in contact with an abutment, changes the natural frequency of the vibratory system as compared with the natural frequency thereof when the piston is out of contact with an abutment, and so even in such case contributes to the reduction of vibration.

From the above discussed diagrams it will be observed that the piston has no influence before the vibratory deflection reaches a certain value, but as the deflection increases above the minimum value at which the piston becomes effective, the damping action of the piston becomes progressively stronger, due to the fact that its velocity is increased in the same measure as the deflection increases.

In the foregoing consideration of the theoretical aspects of the principles involved, it has been assumed for the sake of simplicity that the inertia or damping mass (represented by piston 2) is stopped in its terminal positions by striking solid abutments. In practice, however, such an arrangement is not at all desirable. The impact between solid bodies, such for example as bodies of metal, would produce knocking of highly undesirable character, and would moreover result in the generation of heat due to the impacts which could cause difficulties. Wear would also be a further undesirable result.

In order to enable the principles of the invention to be carried into practical effect the invention contemplates the provision of silencing abutments in the form of liquid cushions or buffers consisting of trapped bodies of liquid against which the damping body or bodies abut at their terminal positions.

In its physical aspects the invention may be applied in a wide variety of different forms and in the following different embodiments will be described by way of example, but without limitation with respect to the scope of the invention.

Referring now more particularly to Figs. 4 and 5, a shaft subject to torsional vibration is indicated at 10. To this is rotationally fixed as by means of key 12, a part 14 providing a series of peripherally spaced radially projecting wings 16 having cylindrically curved outer surfaces 18. The core of part 14 has cylindrically curved surfaces 20 between the wings. The inertia or damping mass indicated generally at 22 is in the form of an annular housing or shell consisting of two halves 22a and 22b mounted to have rotational movement or angular displacement relative to the shaft. The housing encloses the wings 16 and is provided with a series of peripherally spaced wings 24 which project radially inwardly between the spaced wings 16 on part 14 to form what are in effect pistons. The inner cylindrically curved surface 26 of the housing 22 engages the outer surfaces 18 of wings 16 and the cylindrically curved inner surfaces 28 of wings or pistons 24 engage the surfaces 20. There are thus formed within the housing two groups of chambers 30a and 30b, each chamber of the respective groups lying on the same side, rotationally considered, of its associated piston 24.

Chambers 30a are directly interconnected by channels 32, 34, 36, and 37 which communicate with a common channel 38, while chambers 30b are directly interconnected by channels 40, 42, 44, and 45 which communicate with a common channel 46.

The outer ends of channels 32, 34, 36, and 37 terminate respectively in ports 32a, 34a, 36a, and 37a which are spaced from the ends of the chambers formed by the respective wings 16, and channels 40, 42, 44, and 45 terminate respectively in ports 40a, 42a, 44a, and 45a which are likewise spaced from the ends of the chambers into which they open.

In the embodiment illustrated, the channels 38 and 46 are connected through an adjustable valve, indicated at 48, located to be adjusted from the exterior of the device and operable to vary the area for flow from channel 38 to channel 46, or vice versa.

In operation, the several chambers and channels are filled with liquid such as oil and leakage from the fluid system is, in the embodiment illustrated, replaced from a supply conduit 50 communicating with an annular channel 52 in a stationary bushing 54 which in turn communicates with the fluid system by way of a non-return valve 56.

It is believed the action of the structure as a damping device will readily be understood from the discussion of the principles of the invention with reference to Figs. 1 to 3. In this instance the mass corresponding to piston 2 in these figures is provided by the housing member 22 which includes the pistons 24, the latter oscillating in their several chambers under the influence of vibratory movement of shaft 10 in the same manner as does piston 2 in housing 1. If it is assumed that a condition of free flow exists between channels 38 and 46 the movement of the pistons 24 between their terminal positions will be substantially free, since for any given movement of the pistons relative to the shaft member the volume of the chambers 30a increases or decreases, as the case may be, inversely as the volume of the chambers 30b increase or decrease. Thus, the mass will have substantially free oscillating movement between its terminal positions. The terminal positions are determined by the positions in which the pistons 24 cover ports 32a, 34a, and 36a as they approach one end of their respective strokes or cover ports 40a, 42a, and 44a as they approach the other ends of their respective strokes.

Since these ports are spaced from the end walls of the respective chambers, the closure thereof by the pistons provides trapped liquid bodies at the ends of the chambers which operate as silencing abutments and through which the forces acting to damp the vibrations are transmitted.

If communication between channels 38 and 46 is restricted by means of valve 48, the principles governing the action of the device are not altered since such throttling merely operates to vary by a matter of degree the resistance to movement of the inertia mass. Even with increased resistance, the resistance to turning movement of the mass relative to the shaft is substantially constant and the effect of such increased resistance is merely to reduce the speed of movement of the mass relative to the shaft so as to insure impact thereof against a terminal abutment at a time when the terminal abutment is subject to vibratory deflection in a direction opposing that of the movement of the mass. As heretofore explained, the use of throttling or other increased resistance is desirable only in order to avoid a condition such as that discussed in connection with Fig. 3 of the drawings and as previously noted it is preferable to prevent such condition from arising by proper selection of the values of weight and stroke of the inertia mass.

The principles of the invention may be embodied in many different specific designs of apparatus and in Figs. 6 and 7 another form of apparatus is illustrated in which the inertia mass includes weights 60 and 62 pivoted at 64 and 66 respectively to a part 68 rotationally fixed as by means of key 70 to the shaft 10 which is subject to forces productive of torsional vibration.

The arms of weight 60 bear against pistons 72 and 74 mounted in suitable recesses in part 68 providing chambers 76 and 78, respectively. Similarly, weight 62 engages pistons 80 and 82 mounted in recesses providing chambers 84 and 86.

Chambers 76 and 80 are placed in communication by channel 88 terminating in ports 88a and 88b communicating respectively with the chambers 76 and 84 at places spaced from the end walls thereof. Chambers 78 and 86 are connected by channel 90 having terminal ports 90a and 90b communicating respectively with chambers 78 and 82 at places spaced from their end walls. Channels 88 and 90 are placed in communication with each other by a channel 92 which in turn advantageously communicates with a feed channel 94 in shaft 10 through which make-up liquid to replace leakage may be supplied.

As will be largely evident from the drawings, this arrangement operates in accordance with the principles previously discussed, the weights 60 and 62 and their associated pistons having limited movement angularly with respect to the shaft under the influence of the shaft vibrations. One terminal position of the inertia mass is determined by closing of ports 88a and 90b by pistons 72 and 82, respectively, while the opposite terminal position is determined by closure of ports 88b and 90a by pistons 80 and 74, respectively. The spacing of the ports from the end walls of their respective chambers provides the desired silencing abutments in each terminal position, in the form of trapped liquid cushions.

In Figs. 8 to 10, a construction somewhat similar to that illustrated in Figs. 6 and 7 is shown. In the present instance, the damping device is shown mounted on the crank web 96 of a crankshaft 100 and comprises inertia mass including a weight 102 pivotally mounted on pin 104 carried by the crank web. The ends of weight 102 engage pistons 106 and 108 mounted in suitable recesses of the crank web providing chambers 110 and 112, respectively. Chambers 110 and 112 are interconnected by channel 114 which terminates in ports 114a and 114b spaced respectively from the end walls of chambers 110 and 112. As in the previous embodiments discussed, the channel 114 may be advantageously supplied with make-up liquid to replace leakage, through a supply channel 116 in the shaft. It is believed that the operation of this form of damper will be quite obvious from the description of the preceding embodiment and need not further be described in detail.

It will be apparent that when the cushioning of the inertia mass is effected by bodies of liquid trapped by pistons or the like, an absolutely liquid tight seal between the piston and its cooperating cylinder or other recess is not essential to successful operation of the device, since the frequency of vibration and resulting oscillating movements of the mass is, in all ordinary cases, so rapid that the action of the liquid bodies as abutments is effective for the purposes desired even if some leakage can occur past the pistons. In other words, the time element is so short that an absolutely liquid tight seal is not essential. As previously noted, it is in most instances desirable to have the inertia mass substantially free to move within its limited sphere of movement and consequently it is ordinarily desirable to avoid parts so tightly fitted as to introduce material factors of mechanical friction. Such being the case, leakage of liquid past the pistons, particularly during long periods of inactivity of the device, may in some instances result in the pistons reaching an end position in their chambers and this possibility may, if desired, be prevented by the use of very light centering springs tending to maintain the pistons in their mid-positions. In this connection it is to be noted, however, that if any such springs are employed, their strength must be very weak in comparison with the inertia forces developed by the action of the device since if stronger springs are employed, the desired action in accordance with the principles of the present invention cannot be obtained. In other words, any variable resistance which increases as the pistons approach their terminal positions from mid-position, and which variable resistance is sufficient to form an appreciable factor in the operation of the device, should be avoided.

In connection with the character of the resistance to movement imposed on the inertia mass between its terminal positions, it is to be understood that as employed in the appended claims, the term substantially constant resistance is to be understood as including cases where such resistance is imposed only by the unavoidable frictional resistance due to internal friction of the liquid, friction between the liquid and walls of the conduits, etc. In other words, this term is to be understood as including the condition where there is substantially free movement of the mass between its terminal positions.

What is claimed is:

1. In a torsional vibration damper, a rotatable member subject to torsional vibration, an inertia member mounted to rotate with the first mentioned member and to have limited angular movement relative thereto, one of said members providing a piston and the other of said members having a recess in which said piston is movably mounted, said recess providing a chamber for fluid at each side of said piston, and channel means interconnecting said chambers and providing for flow of fluid therebetween, said channel means communicating with the respective chambers through ports spaced from the end walls thereof and located to be closed by said piston in its terminal positions to thereby provide abutments consisting of trapped fluid bodies for stopping said piston, and said piston being mounted to move to said terminal positions under the influence of forces resulting from torsional deflection of said rotatable member.

2. In a torsional vibration damper, a rotatable member subject to torsional vibration, means including a member providing inertia mass mounted to rotate with and have angular movement relative to the first mentioned member due to the inertia of said mass, said members including a piston part rotationally fixed with respect to one member and a chamber for fluid in the other member in which said piston is located, and means including a port arranged to be substantially closed by said piston part in a terminal position thereof to stop movement of said piston part relative to said member due to fluid trapped in said chamber upon closure of said port.

3. In a torsional vibration damper, a rotatable shaft member subject to torsional vibration, an annular inertia member around said shaft member and mounted to have angular movement relative thereto, one of said members having at least one radially extending piston-like projection thereon and the other of said members having a recess therein into which said projection extends and in which said projection moves upon relative angular displacement between said members, said recess providing a chamber for fluid at either side of said projection, said chambers being interconnected for flow of fluid therebetween and having ports for flow of fluid to and from the chambers, said ports being spaced from the end walls of the respective chambers and located to be closed by said projection in its terminal positions to provide trapped fluid bodies forming abutments determining said terminal positions.

4. In a torsional vibration damper, a rotatable shaft member subject to torsional vibration, an annular inertia member around said shaft member and mounted to have angular movement relative thereto, said shaft member having at least one radially extending piston-like projection thereon and said annular member having a recess therein into which said projection extends and in which said projection moves upon relative angular displacement between said members, said recess providing a chamber for fluid at either side of said projection, said chambers being interconnected for flow of fluid therebetween and having ports for flow of fluid to and from the chambers, said ports being spaced from the end walls of the respective chambers and located to be closed by said projection in its terminal positions to provide trapped fluid bodies forming abutments determining said terminal positions.

5. A torsional vibration damper for a crankshaft having a crank web comprising an inertia weight pivotally mounted with respect to said crank web, piston-like parts mounted in recesses in said crank web to move with said inertia weight relative to the crank web, said recesses providing chambers for fluid, said chambers being interconnected for flow of fluid therebetween and having ports spaced from their end walls for flow of fluid to and from said chambers, said ports being located to be covered by said piston-like parts to provide trapped fluid bodies in said chambers for determining the terminal positions of said piston-like parts and limiting the angular movement of said weight relative to said rotatable member.

6. In a torsional vibration damper, a rotatable member subject to torsional vibration, a member providing inertia mass rotatable with the first mentioned member and having limited angular movement with respect thereto, the resistance to movement of said mass between its terminal positions being substantially constant, and means for determining said terminal positions including a recess formed in one of said members, a piston in said recess movable with the other of said members, a port arranged to be closed by movement of said piston and a body of liquid in said recess adapted to be trapped to provide a terminal abutment for said piston when said port is closed, said piston being movable through substantially its entire path of travel before said port is closed to trap the liquid.

7. In a torsional vibration damper, a rotatable member subject to torsional vibration, a member providing inertia mass rotatable with the first mentioned member and having limited angular movement with respect thereto, the resistance to movement of said mass between its terminal positions being substantially constant, and means for determining said terminal positions including a recess formed in one of said members, a piston in said recess movable with the other of said members, a port communicating with said recess in the side thereof adjacent to the axis of rotation of said rotatable member and a body of liquid in said recess adapted to be trapped to provide a terminal abutment for said piston when said port is closed, there being no space in said recess and within a circle struck about said axis of rotation and intersecting said port available for occupancy by fluid when said port is closed by movement of said piston.

8. In a torsional vibration damper, a rotatable and torsionally vibratory member, vibration dampening means providing inertia mass and including a piston part rotatable with said member and movable relative thereto due to the inertia of said mass, means providing a fluid chamber between said piston part and said member and means comprising a port arranged to be substantially completely closed by said piston part in a terminal position thereof whereby movement of said piston part relative to said member is stopped due to fluid trapped in said chamber upon closure of said port.

9. In a torsional vibration damper comprising a shaft, a liquid containing housing oscillatingly movable on said shaft, a body rigidly fixed to said shaft concentrically mounted in said housing, and means for establishing enclosed and liquid filled chambers between said housing and said body in stop positions of said housing, said means comprising alternating projections on said oscillating housing and said body, and fluid conduits providing communication between the chambers on both sides of said projections and terminating in ports circumferentially spaced from the walls of the projections of said body whereby the projections on said oscillating housing may cover said openings to trap fluid between said projections.

10. In a torsional vibration damper, a torsionally vibratory element, vibration dampening means including a piston member and a member providing a fluid chamber between said members, one of said members being rotatable with said element, and the other of said members being relatively movable with respect to said element and providing inertia mass, and means comprising a port arranged to be substantially completely closed by said relatively movable member in a terminal position thereof whereby movement of said relatively movable member with respect to said element is stopped due to fluid trapped in said chamber upon closure of said port.

11. In a torsional vibration damper, a rotatable member subject to torsional vibration, inertia mass comprising a plurality of pivotally mounted weights arranged to have limited movement with respect to said member due to inertia, and means comprising piston-like parts for determining the terminal positions of said weights, each piston-like part being mounted to move in a chamber having a closed end formed in said rotatable member, each chamber having a port spaced from said closed end, terminal positions of said weights being determined by terminal positions of said piston-like parts, the terminal positions of said piston-like parts being determined by closure of said ports by the piston-like parts, due to fluid trapped in said chambers.

12. In a torsional vibration damper, a rotatable member subject to torsional vibration, a vibration dampening member providing inertia mass rotatable with said rotatable member and movable relative thereto due to the inertia of said mass, means offering substantially constant resistance to said movement, means providing enclosed chambers between said rotatable member and said dampening member, and channel means adapted to provide a flow of liquid to and from said chambers, said channel means communicating with the respective chambers through ports located to be closed by one of said members and to provide substantially completely trapped bodies of liquid forming abutments for determining the terminal positions of said inertia member, said ports respectively opening into said chambers within the innermost longitudinal third portion of said chambers closest to the center of rotation of said rotatable member.

13. In a torsional vibration damper, a rotatable member subject to torisonal vibration, a vibration dampening member providing inertia mass rotatable with said rotatable member and having substantially free movement relative thereto due to the inertia of said mass, means providing enclosed chambers between said rotatable member and said dampening member, and channel means adapted to provide a flow of liquid to and from said chambers, said channel means communicating with the respective chambers through ports located to be closed by one of said members and to provide substantially completely trapped bodies of liquid forming abutments for determining the terminal positions of said inertia member, said ports respectively opening into said chambers along the radially innermost surface of said chambers at points on said surface closest to the center of rotation of said rotatable member.

14. In a torsional vibration damper, a rotatable member subject to torsional vibration, a vibration dampening member providing inertia mass rotatable with said rotatable member and movable relative thereto due to the inertia of said mass, means offering substantially constant resistance to said movement, means providing enclosed chambers between said rotatable member and said dampening member, and channel means interconnecting said chambers and adapted to provide a flow of liquid to and from said chambers, said channel means communicating with the respective chambers through ports located to be closed by one of said members and to provide substantially completely trapped bodies of liquid forming abutments for determining the terminal positions of said inertia member, said ports respectively opening into said chambers along the radially innermost surface of said chambers at points on said surface closest to the center of rotation of said rotatable member.

15. In a torsional vibration damper, a rotatable member subject to torsional vibration, a vibration dampening member providing inertia mass rotatable with said rotatable member and having substantially free movement relative thereto due to the inertia of said mass, means providing enclosed chambers between said rotatable member and said dampening member, and channel means interconnecting said chambers and adapted to provide a flow of liquid to and from said chambers, said channel means communicating with the respective chambers through ports located to be closed by one of said members and to provide substantially completely trapped bodies of liquid forming abutments for determining the terminal positions of said inertia member, said ports respectively opening into said chambers within the innermost longitudinal third portion of said chambers closest to the center of rotation of said rotatable member.

EDVIN OSSIAN PARCIVAL THEGE.